Oct. 18, 1960  G. M. RAPATA  2,956,605
PLASTIC SCREW RECEIVING INSERT HAVING A CIRCULAR
BODY AND A POLYGONAL HEAD
Original Filed March 5, 1953

INVENTOR.
George M. Rapata
BY Olson & Trexler
attys.

United States Patent Office 2,956,605
Patented Oct. 18, 1960

2,956,605

PLASTIC SCREW RECEIVING INSERT HAVING A CIRCULAR BODY AND A POLYGONAL HEAD

George M. Rapata, Chicago, Ill., assignor to Illinois Tool Works, Chicago, Ill., a corporation of Illinois Original application Mar. 5, 1953, Ser. No. 340,625, now Patent No. 2,788,047, dated Apr. 9, 1957. Divided and this application Sept. 14, 1956, Ser. No. 610,010

2 Claims. (Cl. 151—41.75)

The present invention relates to a novel fastening device, and more particularly, to a novel anchor member insertable within an aperture in a workpiece for receiving and retaining a screw or the like. This application is a division of my co-pending application Serial No. 340,625, filed March 5, 1953, which issued into Patent 2,788,047, on April 9, 1957.

An object of the present invention is to provide a novel one-piece plastic fastening device or anchor member which may be quickly and easily applied to an apertured panel or workpiece and which is adapted to accommodate a screw or similarly threaded member and to lock the threaded member against unauthorized retrograde movement.

Another object of the present invention is to provide a novel one-piece plastic fastening device or anchor member which may be retained against rotation after application to an apertured workpiece so as to facilitate the assembly of a screw or the like with the anchor member.

Other objects and advantages of the present invention will become apparent from the following description and the accompanying drawings wherein.

Figure 1:
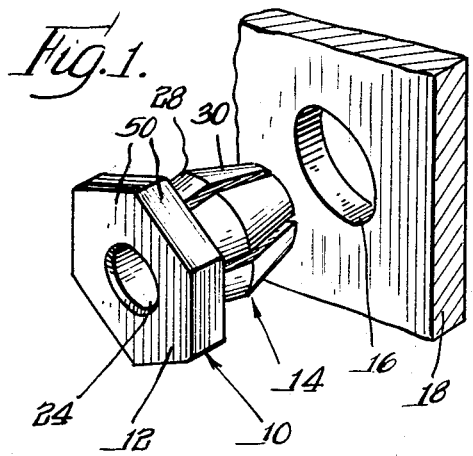
Fig. 1 is a perspective view showing a fastening device incorporating the features of the present invention in position to be assembled with an apertured workpiece.
Figure 2:
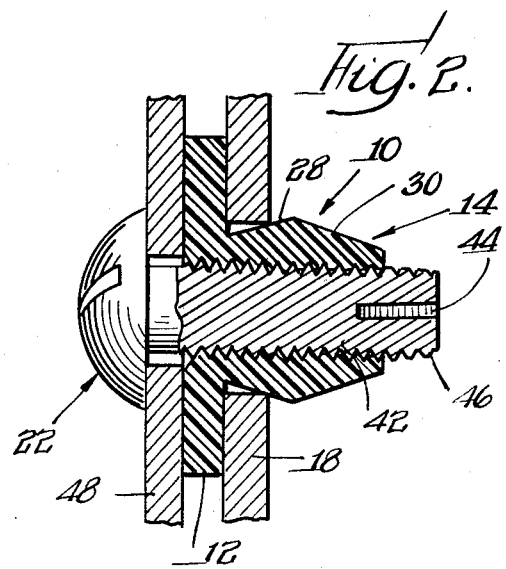
Fig. 2 is a sectional view showing a work assembly including a fastening device of the present invention.
Figure 3:
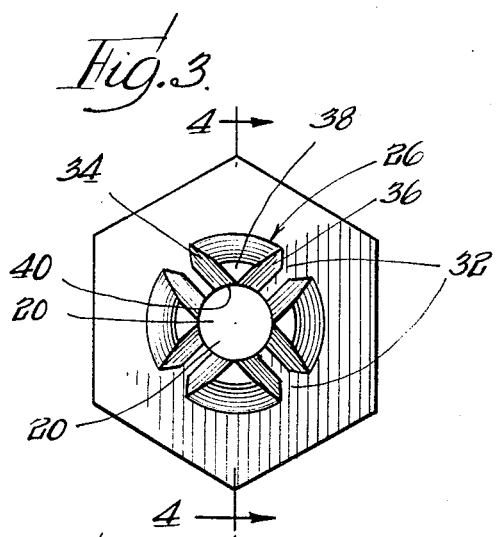
Fig. 3 is an entering end view of the fastening device shown in Figs. 1 and 2.
Figure 4:
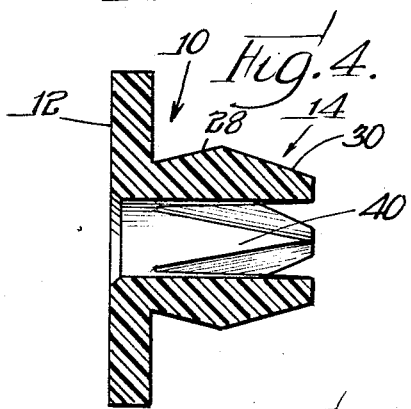
Fig. 4 is a sectional view taken along line 4—4 in Fig. 3.

Referring now more specifically to the drawings wherein like parts are designated by the same numerals throughout the various figures, a fastening device or anchor member 10 incorporating the features of the present invention is shown in Figs. 1 through 4 and 6. The one-piece anchor member is preferably molded from suitable resilient plastic material which also has electrical insulating characteristics. The anchor member 10 includes a head portion 12 and an axially extending shank portion 14 insertable through an aperture 16 and a workpiece or panel 18. A bore 20 extends centrally through the head and shank portions for accommodating a screw member 22 or the like, which bore initially has smooth surfaces and is of substantially uniform diameter throughout its length except for a flaring or frusto-conical mouth portion 24 which facilitates starting of the screw into the bore.

In this embodiment the shank portion 14 has a circular transverse configuration and is bisected along right angularly disposed planes so as to provide four axially extending identical shank elements 26. Outer surfaces of these shank elements flare outwardly from the head portion 12 as indicated at 28 for providing shoulders for engaging behind the workpiece or panel 18. The outer surfaces terminate in converging entering end surface sections 30 which facilitate application of the anchor member to the apertured workpiece. As a result of this arrangement of the surface sections 28 and 30, the free or entering end portions of the shank elements progressively decrease in radial cross section toward the entering terminal ends thereof so that they are increasingly flexible toward their entering ends.

The shank elements 26 are circumferentially spaced from each other by slots 32, which slots are relatively narrow adjacent the head portion 12 and increase in width toward the entering ends of the shank elements. In other words, opposite generally axially extending side surfaces 34 and 36 of each of the shank elements 26 converge toward the entering ends of the shank elements so as further progressively to reduce the transverse cross section of the entering end portions of the shank elements and thereby further progressively increase the flexibility of the entering end portions. As shown best in Fig. 3, the surfaces 34 and 36 converge so that the terminal end 38 of each of the shank elements has a generally triangular configuration and so that the axially extending groove 40 provided by the bore 20 in the inner surface of each of the shank elements progressively decreases in transverse arcuate extent until it becomes a V edge at the terminal end 38.

The screw 22 is preferably a thread cutting screw which may be of any of the usual constructions. In the embodiment illustrated, the screw 22 includes a threaded shank 42 which is slotted in the usual manner, as at 44, to provide thread cutting edges. The threads at the free end 46 of the screw shank preferably progressively decrease in height so that the end of the screw is in effect tapered to facilitate insertion to the anchor member.

When utilizing the anchor member 10, it is first applied to the workpiece or panel 18 by passing the shank portions through the aperture 16. The inwardly inclined surfaces 30 act as cams to compress the shank portions toward each other so that the relatively thick or shoulder portions of the shank elements may pass through the workpiece aperture. A workpiece 48 is then assembled over the head portion 12 of the anchor member, and the screw is inserted through the workpiece 48 and into the anchor member. It should be noted that the head portion 12 has a non-circular configuration and is preferably provided with a plurality of straight side edges 50 so that the head portion may be easily grasped with a suitable tool, not shown, to prevent the anchor member from rotating as the screw is turned into the anchor member.

Figure 6:
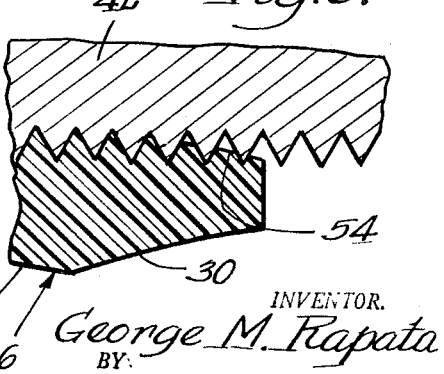
Fig. 6 is an enlarged fragmentary sectional view showing cooperable engagement between a portion of the fastening device and a screw member in greater detail.

As the screw is threaded into the anchor member, complementary threads are formed in the smooth walls of the bore 20, as shown best in Fig. 6. In addition, the screw causes the shank elements 26 to expand away from each other so that the inclined surfaces or shoulders 28 are pressed tightly against the back of the workpiece 18 securely to hold the anchor member in place and to draw the head portion 12 firmly against the face of the workpiece. It is to be noted that as a result of the relative rigidity of the thicker portions of the shank elements, which portions are also backed up by the workpiece, threads 52 formed in the inner surfaces 40 of the shank elements are of full depth for maximum strength and resistance to axial stripping. However, as the end of the screw progresses toward the entering end relatively flexible portions of the shank elements, only partial thread segments are formed in the shank elements, as shown at 54 in Fig. 6. This result is obtained since the relatively flexible free end portions of the shank elements are not sufficiently rigid to withstand the forces necessary for the formation of full depth threads. It has been found that these partial depth thread segments provide an advantage in that they resiliently grip the threads of the screw under the pressure caused by the inherent resiliency of the outwardly flexed entering end portions of the shank elements and thereby lock the screw against unauthorized retrograde movement. In order to obtain the full benefit of this gripping and locking action, the shank of the screw is preferably sufficiently long so that the tapered end portion 46 thereof is located beyond the terminal entering end of the anchor member when the screw is fully tightened whereby only full height threads on a screw shank are gripped by the partial thread segments of the anchor member.

Figure 5:
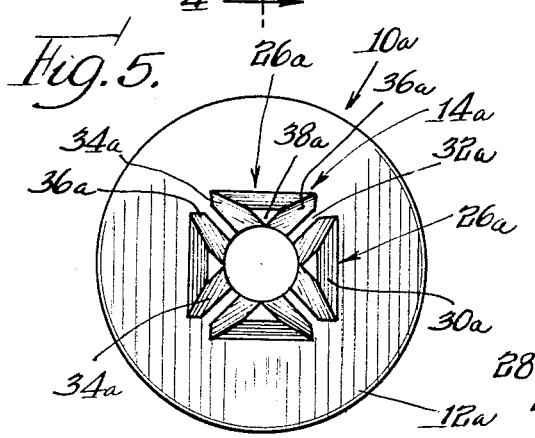
Fig. 5 is an entering end view of a modified form of the present invention.

Fig. 5 shows another embodiment of the present invention which is similar to the above described structure as indicated by the application of identical reference numerals with the suffix "a" added to corresponding elements. In this embodiment the shank means 14a is provided with a rectangular peripheral configuration and is especially suitable for insertion into a rectangular aperture in a workpiece. With this arrangement, the broad substantially flat outer surfaces of the shank elements 26a are adapted to cooperate with the straight edges of the workpiece aperture to prevent the anchor member from rotating during application of a screw thereto.

While the preferred embodiments of the present invention have been shown and described herein, it is obvious that structural details may be changed without departing from the spirit and scope of the appended claims.

The invention is claimed as follows:

1. A fastening device including a one-piece resinous relatively hard resilient plastic anchor member, having a shank adapted for axial insertion within a complementary aperture of a workpiece such, for example, as sheet paneling, a rigid head extending radially outwardly from one extremity of said shank and having a work-clamping surface on the side thereof adjacent said shank, the outer periphery of said head having an irregular configuration to accommodate a gripping tool, the portion of the shank periphery in the vicinity of said head being substantially circular in cross section whereby to accommodate said shank to a complementary circular aperture in a workpiece, said shank being provided with a longitudinal initially unthreaded bore extending completely through said head and shank for accommodating a thread-forming screw member, the diameter of said bore throughout its length being at least as great as the diameter thereof in the vicinity of said head, said shank being longitudinally bifurcated by slots completely traversing said shank over substantially the entire longitudinal extent thereof, said slots being positioned in planes intersecting each other along a line substantially coincident with the shank axis so as to define a plurality of shank elements of arcuate cross section and forming radial continuations of said unthreaded shank bore, the width of each slot adjacent said bore being substantially less than the diameter of the bore, the portion of the shank extending axially from said head defining a frusto-conical surface and providing shoulder means on the periphery of each shank element in the form of radially thickened portions positioned intermediate the clamping surface of the head and the entering extremity of each element for engagement with a complementary workpiece and cooperatively disposed with respect to said head for retaining the anchor member in assembled relation with said workpiece, the entering extremities of said shank elements having arcuate, concentric entering peripheral surfaces converging toward the shank axis and defining a frusto-conical surface to facilitate initial insertion of the shank within a complementary circular work aperture and providing relatively thin shank sections at the free extremities of said elements as compared with the radial thickness of the remainder of said shank elements, the external diameter of said free shank extremities being less than the complementary work aperture, and a thread-forming screw member having a shank of a length at least as great as the axial extent of said head and shank elements and an outer diameter larger than said initially unthreaded bore sufficient to assure complementary full thread convolutions in the bore of the head and within the bore of said first-mentioned frusto-conical shank portion upon telescopic association therewith for effectively resisting stripping of thread convolutions of the anchor member after said telescopic association, said free entering extremities of said shank sections being of a length and extending beyond said workpiece sufficiently to cause flexing outwardly upon engagement therewith by convolutions of the screw member to present partially formed complementary threads which yieldably impinge the adjacent thread convolutions of the screw member to secure said screw and anchor member against unauthorized relative rotation after assembly thereof, said irregular peripheral configuration of the periphery of the anchor member head being constructed and arranged for co-action with a head-gripping tool when authorized relative rotation between the screw and anchor member occurs, as, for example, during the initial assembly of said parts.

2. A fastening device as set forth in claim 1, wherein the screw member has a tapered entering extremity which projects beyond the free ends of the shank elements after the anchor and screw members have been telescopically assembled.

References Cited in the file of this patent
UNITED STATES PATENTS

| | | |
|---|---|---|
| 1,978,935 | Douglas | Oct. 30, 1934 |
| 2,246,888 | Messenger | June 24, 1941 |
| 2,392,133 | Eklund | Jan. 1, 1946 |
| 2,424,602 | De Swart | July 29, 1947 |
| 2,530,258 | Marsan | Nov. 14, 1950 |
| 2,542,144 | Kearns | Feb. 20, 1951 |
| 2,545,514 | Erb | Mar. 20, 1951 |
| 2,649,884 | Westover | Aug. 25, 1953 |
| 2,657,894 | Sklenar | Nov. 3, 1953 |
| 2,664,458 | Rapata | Dec. 29, 1953 |
| 2,788,047 | Rapata | Apr. 9, 1957 |